(12) United States Patent
Lee et al.

(10) Patent No.: US 10,539,838 B2
(45) Date of Patent: Jan. 21, 2020

(54) LIQUID CRYSTAL DISPLAY DEVICE AND RELATED MANUFACTURING METHOD

(71) Applicant: Samsung Display Co., Ltd., Yongin-Si, Gyeonggi-Do (KR)

(72) Inventors: Hee-Keun Lee, Suwon-si (KR); Myeong Hee Kim, Yongin-si (KR); Han Joon Yoo, Seoul (KR); Dae Ho Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 645 days.

(21) Appl. No.: 15/068,145

(22) Filed: Mar. 11, 2016

(65) Prior Publication Data
US 2016/0313585 A1   Oct. 27, 2016

(30) Foreign Application Priority Data
Apr. 22, 2015   (KR) .......................... 10-2015-0056761

(51) Int. Cl.
*G02F 1/1341*   (2006.01)
*G02F 1/1333*   (2006.01)

(52) U.S. Cl.
CPC ...... *G02F 1/1341* (2013.01); *G02F 1/133377* (2013.01)

(58) Field of Classification Search
CPC . G02F 1/1341; G02F 1/1368; G02F 1/133377
USPC ........................................................ 349/158
See application file for complete search history.

(56) References Cited

U.S. PATENT DOCUMENTS

| 2009/0290117 | A1* | 11/2009 | Watanabe ......... G02F 1/133305 349/153 |
| 2015/0162386 | A1* | 6/2015 | Furuie ................... H01L 51/525 257/40 |
| 2016/0103377 | A1* | 4/2016 | Bae ................... G02F 1/133377 349/46 |

FOREIGN PATENT DOCUMENTS

| JP | 2008-033117 | 2/2008 |
| JP | 2008-242031 | 10/2008 |
| KR | 10-2002-0047748 | 6/2002 |
| KR | 10-2008-0049193 | 6/2008 |
| KR | 10-2012-0026880 | 3/2012 |
| KR | 10-2013-0124827 | 11/2013 |
| KR | 10-2014-0007202 | 1/2014 |

* cited by examiner

*Primary Examiner* — Charles S Chang
(74) *Attorney, Agent, or Firm* — Innovation Counsel LLP

(57) ABSTRACT

A display device may include a substrate, a transistor, a pixel electrode, a roof layer, and a liquid crystal layer positioned in microcavities between the roof layer and the substrate. The roof layer may include a first roof portion and a second roof portion. The first roof portion may overlap the pixel electrode and may be directly connected to the second roof portion. The second roof portion may be positioned closer to the transistor than the first roof portion. A minimum distance between the substrate and the second roof portion may be less than a minimum distance between the substrate and the first roof portion.

13 Claims, 17 Drawing Sheets

LIQUID CRYSTAL DISPLAY DEVICE AND RELATED MANUFACTURING METHOD

CROSS-REFERENCE TO RELATED APPLICATION

This application claims priority to and the benefit of Korean Patent Application No. 10-2015-0056761 filed in the Korean Intellectual Property Office on Apr. 22, 2015; the entire contents of the Korean Patent Application are incorporated herein by reference.

BACKGROUND (a) Technical Field

The technical field relates to a liquid crystal display device and a related manufacturing method.

(b) Description of the Related Art

A liquid crystal display device may include opposite field generating electrodes (such as a pixel electrode and a common electrode) and a liquid crystal layer interposed between the field generating electrodes. The liquid crystal display device may apply voltage to the field generating electrodes for orienting directions of liquid crystal molecules of the liquid crystal layer, thus controlling transmission of incident light to display images. The liquid crystal display may include two substrates that respectively correspond to the opposite field generating electrodes. These two substrates may undesirably add to weight, thickness, cost, and/or manufacturing time associated with the display device.

The above information disclosed in this Background section is for enhancement of understanding of the background of this application. This background section may contain information that does not form the prior art that is already known in this country to a person of ordinary skill in the art.

SUMMARY

An embodiment may be related to a display device. The display device may include a substrate, a transistor, a pixel electrode, a roof layer, and a liquid crystal layer. The transistor may overlap the substrate. The pixel electrode may be electrically connected to the transistor. The roof layer may include a first roof portion and a second roof portion. The first roof portion may overlap the pixel electrode and may be directly connected to the second roof portion. The second roof portion may be positioned closer to the transistor than the first roof portion. A minimum distance between the substrate and the second roof portion may be less than a minimum distance between the substrate and the first roof portion. The liquid crystal layer may be positioned in microcavities between the substrate and the roof layer.

The display device may include a capping layer that directly contacts an edge of the liquid crystal layer and is positioned over the transistor in a direction perpendicular to the substrate. The second roof portion may be positioned over the edge of the liquid crystal layer in the direction perpendicular to the substrate.

The display device may include a light blocking member that overlaps each of the transistor and the second roof portion.

A first side of the first roof portion may be positioned between the substrate and a second side of the first roof portion. A first side of the second roof portion may be positioned between the substrate and a second side of the second roof portion. A minimum distance between the substrate and the first side of the second roof portion may be less than a minimum distance between the substrate and the first side of the first roof portion.

The first side of the second roof portion may be oriented at an obtuse angle (i.e., an angle greater than 90 degrees and less than 180 degrees) with respect to the first side of the first roof portion.

The first side of the second roof portion may be oriented at the obtuse angle with respect to the second side of the first roof portion.

The first side of the second roof portion may be oriented at the obtuse angle with respect to the substrate.

The second side of the second roof portion may be oriented at the obtuse angle with respect to the second side of the first roof portion.

The second side of the second roof portion may be oriented at the obtuse angle with respect to the substrate.

The display device may include a common electrode that includes a first common electrode portion and a second common electrode portion. The first common electrode portion may be positioned between the substrate and the first roof portion. The second common electrode portion may be positioned between the substrate and the second roof portion. A minimum distance between the substrate and the second common electrode portion is less than a minimum distance between the substrate and the first common electrode portion. The second common electrode portion may be oriented at the obtuse angle with respect to the first common electrode portion.

The display device may include an alignment layer that directly contacts the liquid crystal layer and includes a first alignment portion and a second alignment portion. The first alignment portion may be positioned between the liquid crystal layer and the first roof portion. The second alignment portion may be positioned between the liquid crystal layer and the second roof portion. A minimum distance between the substrate and the second alignment portion may be less than a minimum distance between the substrate and the first alignment portion. The second alignment portion may be oriented at the obtuse angle with respect to the first alignment portion.

The display device may include an insulating layer that includes a first insulating portion and a second insulating portion. The first insulating portion may be positioned between the liquid crystal layer and the first roof portion. The second insulating portion may be positioned between the liquid crystal layer and the second roof portion. A minimum distance between the substrate and the second insulating portion may be less than a minimum distance between the substrate and the first insulating portion. The second insulating portion may be oriented at the obtuse angle with respect to the first insulating portion.

An embodiment may be related to a display device. The display device may include a substrate, a transistor, a pixel electrode, a roof layer, a liquid crystal layer positioned between the substrate and the roof layer, and a capping layer directly contacting an edge of the liquid crystal layer and positioned overlap the transistor (in a directly perpendicular to the substrate). The roof layer may include a first roof portion and a second roof portion. The first roof portion may overlap the pixel electrode and may be directly connected to the second roof portion. The second roof portion may be positioned over the edge of the liquid crystal layer (in the direction perpendicular to the substrate). A minimum distance between the substrate and the second roof portion may be less than a minimum distance between the substrate and the first roof portion.

An embodiment may be related to a method for manufacturing a display device. The method may include the following steps: preparing a substrate; providing a transistor; providing a pixel electrode; providing a roof layer; and providing a liquid crystal layer between the substrate and the roof layer. The roof layer may include a first roof portion and a second roof portion. The first roof portion may overlap the pixel electrode and may be directly connected to the second roof portion. The second roof portion may be positioned closer to the transistor than the first roof portion. A minimum distance between the substrate and the second roof portion may be less than a minimum distance between the substrate and the first roof portion.

A first side of the first roof portion may be positioned between the substrate and a second side of the first roof portion. A first side of the second roof portion may be positioned between the substrate and a second side of the second roof portion. A minimum distance between the substrate and the first side of the second roof portion may be less than a minimum distance between the substrate and the first side of the first roof portion. The first side of the second roof portion may be oriented at an obtuse angle (i.e., an angle greater than 90 degrees and less than 180 degrees) with respect to the first side of the first roof portion.

The method may include providing a roof material layer that has a groove. The method may include deforming (e.g., bending) the roof material layer at the groove to form the roof layer. The groove may have a substantially triangular or V-shaped cross section. The groove may be reduced (and substantially closed) when the roof material layer is deformed (e.g., bent).

The method may include providing an alignment material layer on the roof material layer. A portion of the alignment material layer may be positions inside the groove. The method may include shrinking the portion of the alignment material layer to reduce the groove and to deform the roof material layer.

A first side of the groove may be oriented at an acute angle with respect to a second side of the groove before the roof material layer is deformed. The acute angle may be greater than or equal to a supplementary angle of the obtuse angle. The supplementary angle of the obtuse angle is equal to 180 degrees minus the obtuse angle. The acute angle may be substantially equal to the supplementary angle of the obtuse angle.

The method may include providing a light blocking member before providing the roof material layer. The groove may overlap the light blocking member after the roof material layer has been provided.

The method may include providing a sacrificial layer that includes a protrusion. The groove may be formed at (and overlap) the protrusion. A portion of the protrusion may be positioned inside the groove. The method may include removing the sacrificial layer.

The method may include providing a conductive layer on the sacrificial layer. A portion of the conductive layer may be positioned inside the groove after the roof material layer has been formed. The method may include forming a common electrode using the conductive layer.

The method may include providing a light blocking member before providing the sacrificial layer. The protrusion may overlap the light blocking member after the sacrificial layer has been provided.

A first side of the protrusion may be oriented at an acute angle with respect to a second side of the protrusion. The acute angle may be greater than or equal to a supplementary angle of the obtuse angle. The supplementary angle of the obtuse angle is equal to 180 degrees minus the obtuse angle. The acute angle may be substantially equal to the supplementary angle of the obtuse angle.

An embodiment may be related to a liquid crystal display device that includes the following elements: a substrate; a thin film transistor disposed on the substrate; a pixel electrode connected to the thin film transistor; a roof layer overlapping the pixel electrode and spaced from the pixel electrode; and a liquid crystal layer positioned in microcavities between the roof layer and the pixel electrode. The roof layer includes a flat portion and an inclined portion connected to the flat portion. The inclined portion is inclined with respect to the flat portion, a lower surface of the inclined portion is disposed under an extension line of a lower surface of the flat portion.

The inclined portions may be disposed at both sides of each microcavity.

The liquid crystal display device may further include a light blocking member disposed between the pixel electrode and the thin film transistor.

The inclined portion may overlap with the light blocking member.

The liquid crystal display device may further include an alignment layer disposed on the liquid crystal layer.

The alignment layer may include a lower alignment layer disposed on the pixel electrode and an upper alignment layer facing the lower alignment layer.

The liquid crystal display device may further include a common electrode disposed between the upper alignment layer and the roof layer.

The liquid crystal display device may further include a capping layer contacting the edge of the liquid crystal layer and disposed on the roof layer.

An embodiment may be related to a method for manufacturing a liquid crystal display device. The method may include the following steps: forming a thin film transistor on a substrate; forming a pixel electrode connected to the thin film transistor; forming a sacrificial layer including a protrusion on the pixel electrode; sequentially forming a lower insulating layer, a roof layer, and an upper insulating layer on the sacrificial layer; exposing the sacrificial layer; forming a microcavity between the lower insulating layer and the pixel electrode by removing the sacrificial layer; providing an alignment material layer in the microcavity; forming an alignment layer by curing the alignment material layer; and providing a liquid crystal material in the microcavity. When the alignment material layer is cured for forming of the alignment layer, an inclined portion of the roof layer is bent with respect to a flat portion of the roof layer toward the substrate.

The manufacturing method may further include forming a light blocking member. The light blocking member may be positioned between the pixel electrode and the thin film transistor after the pixel electrode has been formed.

The protrusion may overlap the light blocking member.

The inclined portion may overlap the light blocking member.

The manufacturing method may further include forming a capping layer on the upper insulating layer to seal the microcavity after the liquid crystal material has been provided in the microcavity.

According to embodiments, since the roof layer includes an inclined portion, liquid crystal material may flow down along the inclined portion. Advantageously, embodiments may prevent liquid crystal material from remaining on the roof layer.

DETAILED DESCRIPTION OF EMBODIMENTS

Figure 1:
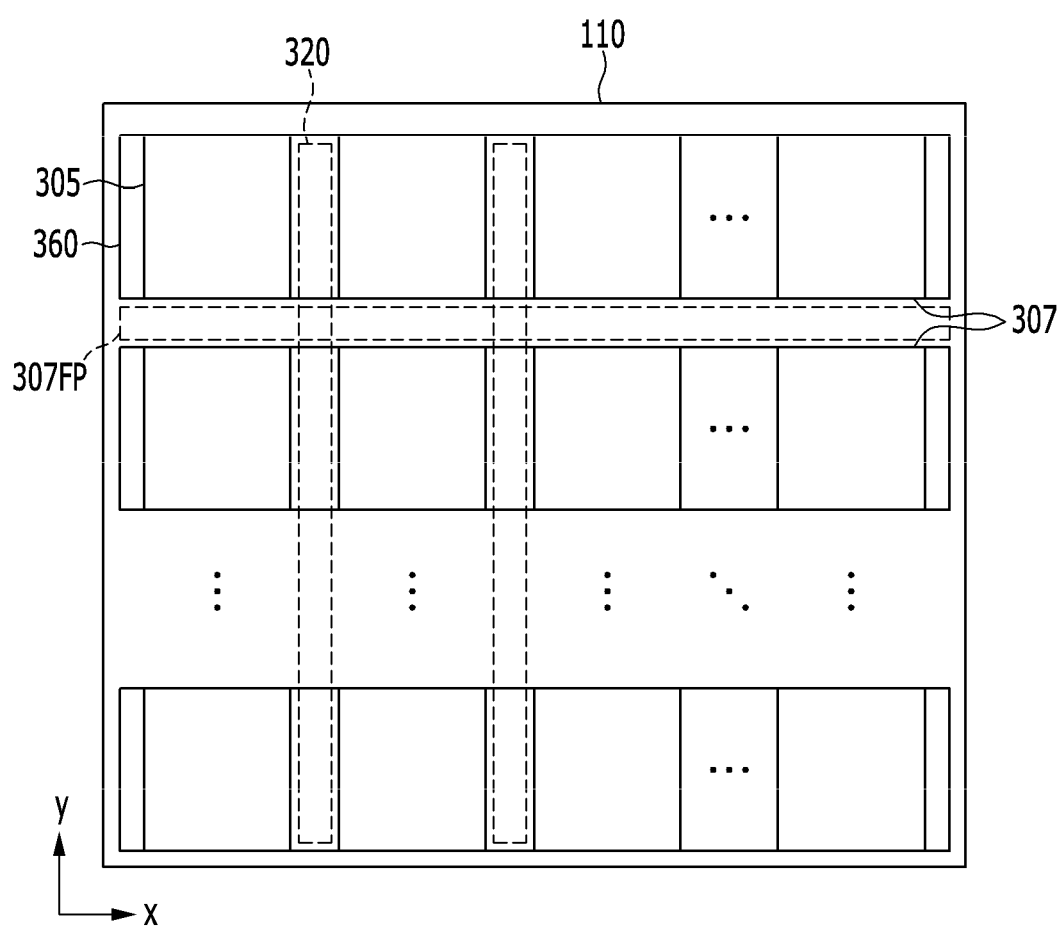
FIG. 1 is a plan view schematically illustrating a liquid crystal display according to an embodiment.

Some embodiments are described with reference to the accompanying drawings. As those skilled in the art would realize, the described embodiments may be modified in various ways. Accordingly, the drawings and description are to be regarded as illustrative in nature and not restrictive.

Although the terms "first", "second", etc. may be used herein to describe various elements, these elements should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used to differentiate different categories or sets of elements. For conciseness, the terms "first", "second", etc. may represent, for example, "first-category (or first-set)", "second-category (or second-set)", etc., respectively.

Like reference numerals may designate like elements in the application.

Size and thicknesses shown in the drawings are shown for understanding and ease of description.

In the drawings, thicknesses of layers, films, panels, regions, etc., may be exaggerated for clarity, ease of understanding, and/or ease of description. When a first element (such as a layer, film, region, or substrate) is referred to as being "on" a second element, the first element can be directly on the second element, or one or more intervening elements may also be present.

Unless explicitly described to the contrary, the word "comprise" and variations (such as "comprises" or "comprising", may imply the inclusion of stated elements but not the exclusion of any other elements. The term "connect" may mean "electrically connect". The term "insulate" may mean "electrically insulate". The phrase "formed on" may mean "formed, provided, and/or positioned on".

A drawing and related description may use a particular position and/or orientation of a device as an example. The device may have various positions and/or orientations.

FIG. 1 is a plan view schematically illustrating a liquid crystal display device (or "liquid crystal display" for conciseness) according to an embodiment.

The liquid crystal display includes a substrate 110, which may be made of an insulating material, such as glass and/or plastic. In an embodiment, the substrate 110 may be a flexible substrate.

Microcavities 305 covered by a roof layer 360 is disposed on the substrate 110. A plurality of roof layers 360 is disposed on the substrate 110. The roof layers 360 adjacent in a row direction contact each other, and the roof layers 360 adjacent in a column direction are separated from each other. One microcavity 305 is formed below one roof layer 360.

Microcavities 305 may be disposed in a matrix form, a partition wall portion 320 is positioned between microcavities 305 adjacent to each other and may extend in a column direction, and a liquid crystal injection hole formation region (called a trench) 307FP is positioned between microcavities 305 adjacent to each other and may extend in a row direction. A liquid crystal injection hole 307 (or opening) of a microcavity 305 may be exposed at the liquid crystal injection hole formation region 307FP. Liquid crystal injection holes 307 are formed at opposite edges of neighboring each microcavity 305.

Each roof layer 360 is separated from the substrate 110 between the adjacent partition wall portions 320 to form the microcavities 305. A roof layer 360 is formed to cover sides of the corresponding each microcavity 305 except for the side of the each microcavity 305 that has a liquid crystal injection hole 307.

In an embodiment, roof layers 360 may be connected to each other in the liquid crystal injection hole formation region 307FP, a part of each roof layer 360 is formed to be separated from the substrate 110 in the partition wall portion 320, and/or adjacent microcavities 305 may be connected to each other.

Figure 2:
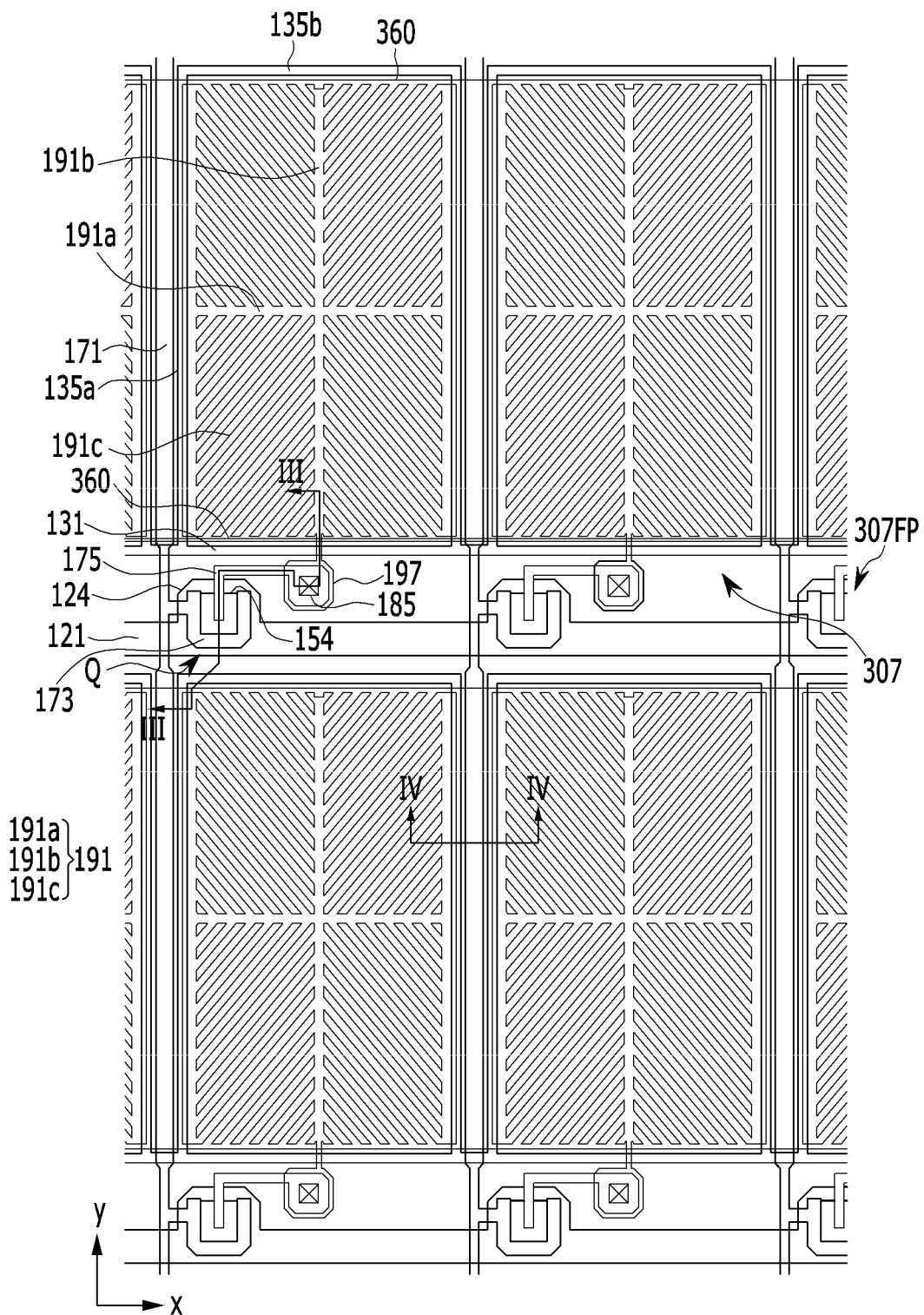
FIG. 2 is a plan view illustrating the liquid crystal display according to an embodiment.
Figure 3:
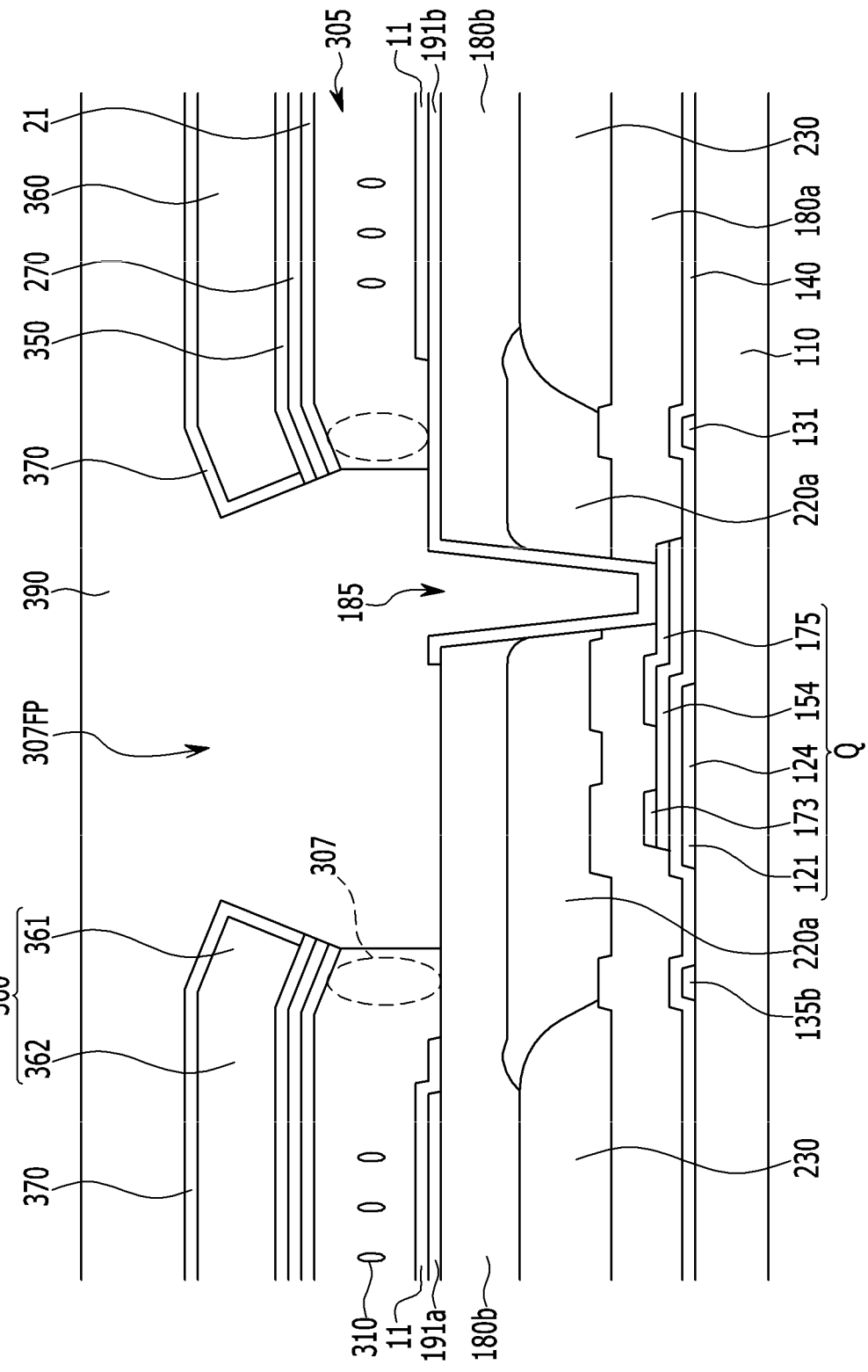
FIG. 3 is a diagram illustrating an example of a cross section taken along line III-III of FIG. 2.
Figure 4:
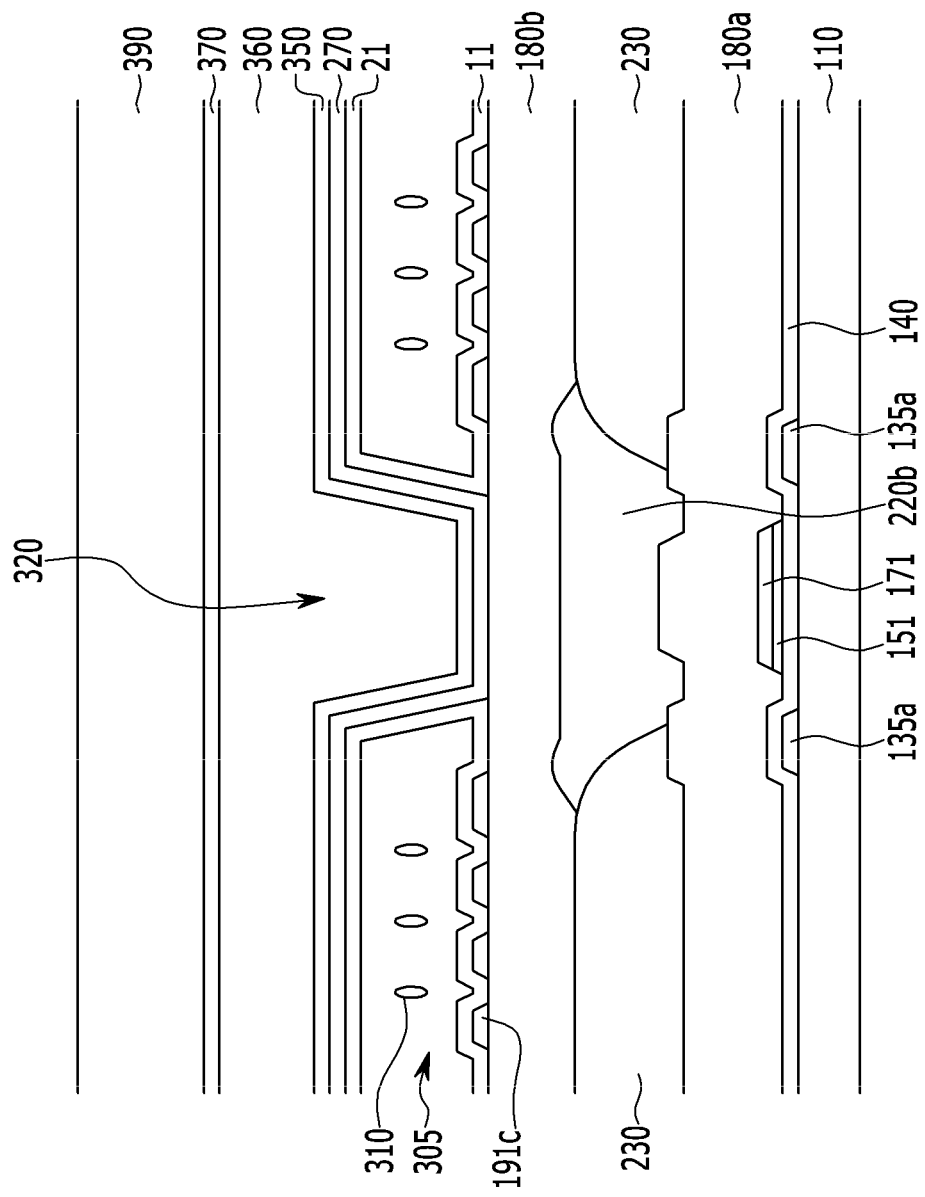
FIG. 4 is a diagram illustrating an example of a cross section taken along line IV-IV of FIG. 2.

FIG. 2 is a plan view illustrating the liquid crystal display according to an embodiment. FIG. 3 is a diagram illustrating an example of a cross section taken along line III-III of FIG. 2. FIG. 4 is a diagram illustrating an example of a cross section taken along line IV-IV of FIG. 2.

FIG. 2 illustrates four adjacent pixels among a plurality of pixels disposed in a matrix form (or array).

Referring to FIGS. 2 to 4, a gate line 121 and a storage electrode line 131, which are separated from each other, are disposed on the substrate 110.

The gate line 121 mainly extends in a horizontal direction and may transfer a gate signal. The gate line 121 includes a gate electrode 124 protruding from the gate line 121. Here, the protruding form of the gate electrode 124 may be modified.

The storage electrode line 131 mainly extends in a horizontal direction and may transfer a predetermined voltage, such as a common voltage. The storage electrode line 131 includes a pair of vertical portions 135a extending substantially vertical to the gate line 121, and a horizontal portion 135b connecting ends of the pair of vertical portions 135a to each other. The vertical portions and the horizontal portion 135a and 135b of the storage electrode line 131 may substantially surround a pixel electrode 191 in the plan view.

A gate insulating layer 140 is disposed on the gate line 121 and the storage electrode line 131. The gate insulating layer 140 may be made of an inorganic material, such as silicon nitride (SiNx) and/or silicon oxide (SiOx). The gate insulating layer 140 may have a single layer structure or a multilayer structure.

A semiconductor layer 151 is disposed on the gate insulating layer 140. The semiconductor layer 151 includes a projection 154 overlapping the gate electrode 124.

The semiconductor layers 151 and 154 may be made of at least one of amorphous silicon, polycrystalline silicon, metal oxide, and the like.

A date line 171, a source electrode 173, and a drain electrode 175 are disposed on the semiconductor layer 151.

The data line 171 may transfer a data signal, mainly extends in a vertical direction, and crosses the gate line 121 and the storage electrode line 131. The source electrode 173 protrudes toward the gate electrode 124 and is disposed on the projection 154 of the semiconductor layer 151. The drain electrode 175 is separated from the data line 171 and disposed on the projection 154 of the semiconductor layer 151. The drain electrode 175 faces the source electrode 173.

Ohmic contacts (not illustrated) may be disposed between the semiconductor layer 151 and the data line 171 and between the projection 154 of the semiconductor layer 151 and the source electrode 173 and the drain electrode 175 to reduce contact resistance. The ohmic contact may be made of silicide or a doped material, such as n+ hydrogenated amorphous silicon in which n-type impurity is doped at a high concentration. In an embodiment, the semiconductor layer 151 is made of the metal oxide, and the ohmic contact may be omitted.

The gate electrode 124, the source electrode 173, and the drain electrode 175 form one thin film transistor Q together with the projection 154 of the semiconductor layer 151, and a channel of the thin film transistor Q is formed in the projection 154 of the semiconductor layer 151 between the source electrode 173 and the drain electrode 175.

A first interlayer insulating layer 180a is disposed on the data line 171, the drain electrode 175, the projection 154 of the semiconductor layer 151 between the source electrode 173 and the drain electrode 175, and the gate insulating layer 140. The first interlayer insulating layer 180a may be made of an inorganic material, such as silicon nitride (SiNx) and/or silicon oxide (SiOx).

A color filter 230, a horizontal light blocking member 220a, and a vertical light blocking member 220b are disposed on the first interlayer insulating layer 180a.

The horizontal light blocking member 220a is disposed substantially parallel with the gate line 121, and the vertical light blocking member 220b is disposed substantially parallel with the data line 171. Horizontal light blocking members 220a and vertical light blocking members 220b are connected to each other to form a lattice structure having openings corresponding to areas that may transmit light for displaying an image. The light blocking members 220a and 220b may be made of a material that does not transmit light. In an embodiment, the horizontal light blocking member 220a and the vertical light blocking member 220b may be formed on an upper insulating layer 370.

The color filter 230 is disposed at an opening defined by the horizontal light blocking member 220a and the vertical light blocking member 220b. The color filter may display a primary color, such as one of red, green, blue, cyan, magenta, yellow, or a white-based color. Color filters 230 may display the same color for pixels adjacent in a horizontal direction, and color filters 230 may display different colors for pixels adjacent in a vertical direction.

A second interlayer insulating layer 180b is disposed on and covers the color filter 230, the horizontal light blocking member 220a, and the vertical light blocking member 220b. The second interlayer insulating layer 180b may include an inorganic material, such as silicon nitride (SiNx) and/or silicon oxide (SiOx), or an organic material. In an embodiment, a step is generated due to a difference in thickness between the color filter 230, the horizontal light blocking member 220a, and the vertical light blocking member 220b, and the second interlayer insulating layer 180b includes an organic material to provide a substantially flat surface.

A contact hole 185 exposing the drain electrode 175 is formed in the horizontal light blocking member 220a and the interlayer insulating layers 180a and 180b.

The pixel electrode 191 is disposed on the second interlayer insulating layer 180b. The pixel electrode 191 may be made of a transparent conductive material, such as indium tin oxide (ITO) and/or indium zinc oxide (IZO).

An overall shape of the pixel electrode 191 may be substantially a quadrangle. The pixel electrode 191 includes a horizontal stem 191a and a vertical stem 191b crossing the horizontal stem 191a. The pixel electrode 191 is divided into four domains by the horizontal stem 191a and the vertical stem 191b, and each domain includes a plurality of minute branches 191c. In an embodiment, the pixel electrode 191 may further include an outer stem surrounding an outside of the pixel electrode 191.

The minute branch 191c of the pixel electrode 191 may extend at an angle in a range of approximately 40° to 45° with respect to the gate line 121 or the horizontal stem 191a. Minute branches 191c of two adjacent domains may be perpendicular to each other. Widths of the minute branches 191c may gradually increase, and/or distances between minute branches 191c may vary.

The pixel electrode 191 includes an extension 197 that is connected to a lower end of the vertical stem 191b and has a larger area than the vertical stem 191b. The pixel electrode 191 is physically and electrically connected to the drain electrode 175 through the contact hole 185 in the extension 197 and may receive a data voltage from the drain electrode 175.

In an embodiment, a structure of the thin film transistor Q and a design of the pixel electrode 191 may be configured for optimizing side visibility.

A common electrode 270 is spaced apart from a pixel electrode 191 at a predetermined distance and overlaps the pixel electrode 191, and a microcavity 305 is disposed between the pixel electrode 191 and the common electrode 270. Common electrodes 270 extend in a row direction and are formed on microcavities 305 and partition wall portions 320. A common electrode 270 may cover an upper side of a microcavity 305.

The common electrode 270 may be made of transparent metal oxide, such as indium tin oxide (ITO) and/or indium zinc oxide (IZO). A common voltage may be applied to the common electrode 270, and a data voltage may be applied to the pixel electrode 191, such that an electric field may be generated.

In an embodiment, a common electrode 270 may be disposed at a same level as the pixel electrode 191 and insulated from the pixel electrode 191 by an insulating layer. In this case, a horizontal field is formed between the common electrode 270 and the pixel electrode 191, and the microcavity 305 may be disposed on the common electrode 270.

A lower alignment layer 11 and an upper alignment layer 21 are disposed on the pixel electrode 191 and below the common electrode 270, respectively. The lower alignment layer 11 and the upper alignment layer 21 may face each other.

The lower alignment layer 11 and the upper alignment layer 21 may be vertical alignment layers. The lower alignment layer 11 and the upper alignment layer 21 may include at least one of polyamic acid, polysiloxane, polyimide, etc. The lower alignment layer 11 and the upper alignment layer 21 may be connected to each other on edges of a microcavity 305.

The microcavity 305 has a liquid crystal injection hole 307 for receiving a liquid crystal material, which includes liquid crystal molecules 310. A liquid crystal layer constituted by the liquid crystal molecules 310 is disposed in the microcavity 305. The liquid crystal molecules 310 have negative dielectric anisotropy and may be oriented in a vertical direction to the substrate 110 when no electric field is applied. That is, the liquid crystal molecules 310 may be vertically aligned. The liquid crystal material may be injected into the microcavity 305 through the liquid crystal injection hole 307 using capillary force. An alignment material forming the lower and upper alignment layers 11 and 21 may be injected into the microcavity 305 through the liquid crystal injection hole 307 before the liquid crystal material is injected. A width and an area of the microcavity 305 may be configured according to a size and a resolution of the display device. A microcavity 305 may be formed in one pixel area, two adjacent pixel areas, or more adjacent pixel areas.

In an embodiment, the liquid crystal injection holes 307 are formed at two immediately neighboring edges of microcavities 305 immediately adjacent to each other in a vertical direction. In an embodiment, injection holes may be formed in only one of the two edges.

A plurality of microcavities 305 is formed in a matrix direction. The microcavities 305 may be divided by the partition wall portion 320 in a horizontal direction (x-axial direction) and divided by the liquid crystal injection hole formation region 307FP in a vertical direction (y-axial direction). In other words, one microcavity 305 may be disposed in a region which is defined by the adjacent partition wall portion 320 and the adjacent liquid crystal injection hole formation region 307FP. The liquid crystal injection hole formation region 307FP includes a vicinity of the liquid crystal injection hole 307 corresponding to the outer portion of the microcavity 305.

A lower insulating layer 350 is disposed on the common electrode 270. The lower insulating layer 350 may be formed of an inorganic material, such as silicon nitride (SiNx) or silicon oxide (SiOx).

A roof layer 360 is disposed on the lower insulating layer 350. The roof layer 360 may define the shape of the corresponding microcavity 305. The roof layer 360 may include a photoresist or other organic materials. The roof layer 360 may be formed of a color filter material.

The roof layer 360 includes an inclined portion 361 and a flat portion 362. The inclined portion 361 is disposed at a liquid crystal injection hole 307, is positioned at an edge of the corresponding liquid crystal layer (represented by liquid crystal molecules 310), and is positioned closer to the corresponding thin film transistor Q than the flat portion 362. Thus, a lower surface of the inclined portion 361 is disposed under an extension line of a lower surface of the flat portion 362. The flat portion 362 overlaps the pixel electrode 191. The inclined portion 361 is connected to the flat portion 362 and inclined toward the substrate 110 from the flat portion 362.

The inclined portion 361 overlaps with the horizontal light blocking member 220a. As a result, light facing the inclined portion 361 is blocked, and light may be prevented from passing through the inclined portion 361.

For providing liquid crystal material into the microcavity 305, the liquid crystal material may be provided using an inkjet process and may be injected into the liquid crystal injection hole 307 using capillary force. Without the inclined portion 361, a substantial amount of the liquid crystal material may remain on the roof layer 360. In an embodiment, since the inclined portion 361 is disposed at a liquid crystal injection hole 307 (through which the liquid crystal material is injected), the liquid crystal material may easily flow down along the inclined portion 361 toward the liquid crystal injection hole 307. Advantageously, liquid crystal material may be prevented from remaining on the roof layer 360 and may be effectively utilized.

A partition wall portion 320 is positioned between microcavities 305 adjacent in the horizontal direction. Portions of the lower insulating layer 350, a common electrode 270, and a roof layer 360 may form the partition wall portion 320. The partition wall portions 320 may extend substantially parallel to the data line 171. Even if the substrate 110 is bent at the partition wall portions 320, generated stress is small, and a change of a cell gap may minimum.

The roof layer 360 and the partition wall portion 320 serve to support microcavities 305 and to maintain the shapes of the microcavities 305.

The upper insulating layer 370 is disposed on the roof layer 360. The upper insulating layer 370 may contact an upper surface of the roof layer 360. The upper insulating layer 370 may be made of an inorganic material, such as silicon nitride (SiNx) and/or silicon oxide (SiOx). The upper insulating layer 370 serves to protect the roof layer 360 (which may be made of an organic material) and, in an embodiment, may be omitted.

A capping layer 390 is disposed on the upper insulating layer 370. The capping layer 390 is positioned even in the liquid crystal injection hole formation region 307FP corresponding to a space between two microcavities 305 adjacent in the vertical direction and covers the liquid crystal injection hole 307 of the microcavity 305 exposed by the liquid crystal injection hole formation region 307FP. That is, the capping layer 390 may seal the microcavities 305 so that the liquid crystal molecules 310 may not leak from the microcavities 305.

The capping layer 390 may be formed by coating and curing a liquid material. The capping layer 390 includes an organic material or an inorganic material. If the upper insulating layer 370 does not exist, the capping layer 390 may directly contact the roof layer 360.

The capping layer 390 may have a multilayer structure, such as a double layer structure or a triple layer structure. The double layer structure may include two layers made of different materials. In the triple layer structure, materials of adjacent layers are different from each other. For example, the capping layer 390 may include a layer made of an organic insulating material and a layer made of an inorganic insulating material.

In summary, as illustrated in FIG. 3 and FIG. 4, a display device may include a substrate 110, a transistor Q, a pixel electrode 191a, a roof layer 360, and a liquid crystal layer (represented by liquid crystal molecules 310). The transistor Q may overlap the substrate 110. The pixel electrode 191a may be electrically connected to the transistor Q. The roof layer 360 may include a (flat) roof portion 362 and a (inclined) roof portion 361. The roof portion 362 may overlap the pixel electrode 191a and may be directly connected to the roof portion 361. The roof portion 361 may be positioned closer to the transistor Q than the roof portion 362. A minimum distance between the substrate 110 and the roof portion 361 may be less than a minimum distance between the substrate 110 and the roof portion 362. The liquid crystal layer 310 may be positioned between the substrate 110 and the roof layer 360.

The display device may include a capping layer 390 that directly contacts an edge of the liquid crystal layer 310 and is positioned over (or overlaps) the transistor Q in a direction perpendicular to the substrate 110. The roof portion 361 may be positioned over (or overlap) the edge of the liquid crystal layer 310 in the direction perpendicular to the substrate 110.

The display device may include a light blocking member 220a that overlaps each of the transistor Q and the roof portion 361.

A first side (e.g., lower side) of the roof portion 362 may be positioned between the substrate 110 and a second side (e.g., upper side) of the roof portion 362. A first side (e.g., lower side) of the roof portion 361 may be positioned between the substrate 110 and a second side (e.g., upper side) of the roof portion 361. A minimum distance between the substrate 110 and the first side of the roof portion 361 may be less than a minimum distance between the substrate 110 and the first side of the roof portion 362.

The first side of the roof portion 361 may be oriented at an obtuse angle (i.e., an angle greater than 90 degrees and less than 180 degrees) with respect to the first side of the roof portion 362.

The first side of the roof portion 361 may be oriented at the obtuse angle with respect to the second side of the roof portion 362.

The first side of the roof portion 361 may be oriented at the obtuse angle with respect to the substrate 110.

The second side of the roof portion 361 may be oriented at the obtuse angle with respect to the second side of the roof portion 362.

The second side of the roof portion 361 may be oriented at the obtuse angle with respect to the substrate 110.

The display device may include a common electrode 270 that includes a first common electrode portion (or flat common electrode portion) and a second common electrode portion (or inclined common electrode portion). The first common electrode portion may be positioned between the substrate 110 and the roof portion 362. The second common electrode portion may be positioned between the substrate 110 and the roof portion 361. A minimum distance between the substrate 110 and the second common electrode portion is less than a minimum distance between the substrate 110 and the first common electrode portion. The second common electrode portion may be oriented at the obtuse angle with respect to the first common electrode portion.

The display device may include an alignment layer 21 that directly contacts the liquid crystal layer 310 and includes a first alignment portion (or flat alignment portion) and a second alignment portion (or inclined alignment portion). The first alignment portion may be positioned between the liquid crystal layer 310 and the roof portion 362. The second alignment portion may be positioned between the liquid crystal layer 310 and the roof portion 361. A minimum distance between the substrate 110 and the second alignment portion may be less than a minimum distance between the substrate 110 and the first alignment portion. The second alignment portion may be oriented at the obtuse angle with respect to the first alignment portion.

The display device may include an insulating layer 350 that includes a first insulating portion (or flat insulating portion) and a second insulating portion (or inclined insulating portion). The first insulating portion may be positioned between the liquid crystal layer 310 and the roof portion 362. The second insulating portion may be positioned between the liquid crystal layer 310 and the roof portion 361. A minimum distance between the substrate 110 and the second insulating portion may be less than a minimum distance between the substrate 110 and the first insulating portion. The second insulating portion may be oriented at the obtuse angle with respect to the first insulating portion.

FIG. 5, FIG. 6, FIG. 7, FIG. 8, FIG. 9, FIG. 10, FIG. 11, FIG. 12, FIG. 13, FIG. 14, FIG. 15, FIG. 16, and FIG. 17 are schematic cross-sectional views illustrating structures formed in a method for manufacturing the liquid crystal display according to an embodiment. FIGS. 5, 7, 9, 10, 12, 14, and 16 illustrate cross-sectional views taken along a line analogous to line III-III indicated in FIG. 2. FIGS. 6, 8, 11, 13, 15, and 17 illustrate cross-sectional views taken along a line analogous to line IV-IV indicated in FIG. 2.

Figure 5:
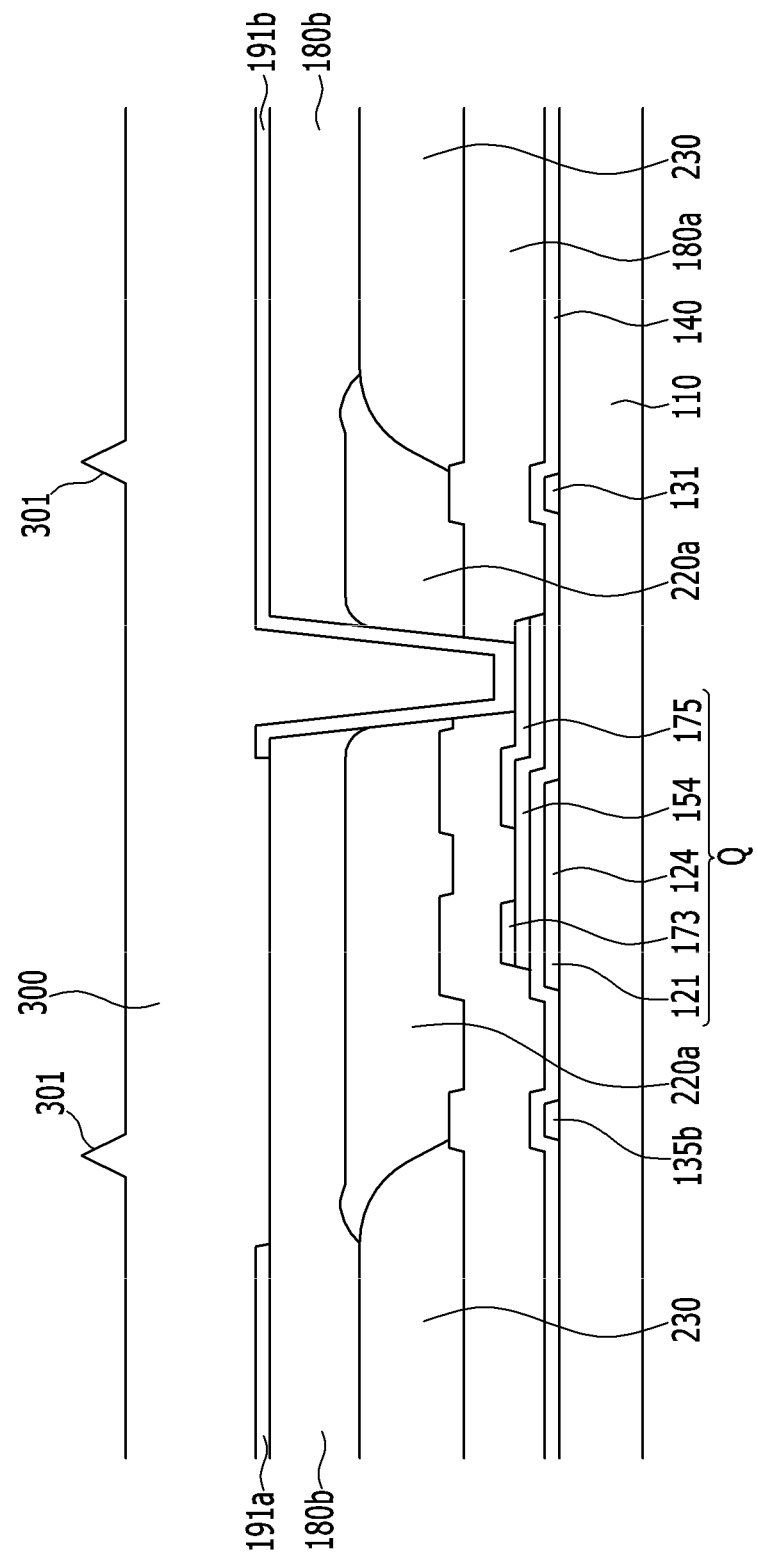
FIG. 5, FIG. 6, FIG. 7, FIG. 8, FIG. 9, FIG. 10, FIG. 11, FIG. 12, FIG. 13, FIG. 14, FIG. 15, FIG. 16, and FIG. 17 are schematic cross-sectional views illustrating structures formed in a method for manufacturing the liquid crystal display according to an embodiment.
Figure 6:
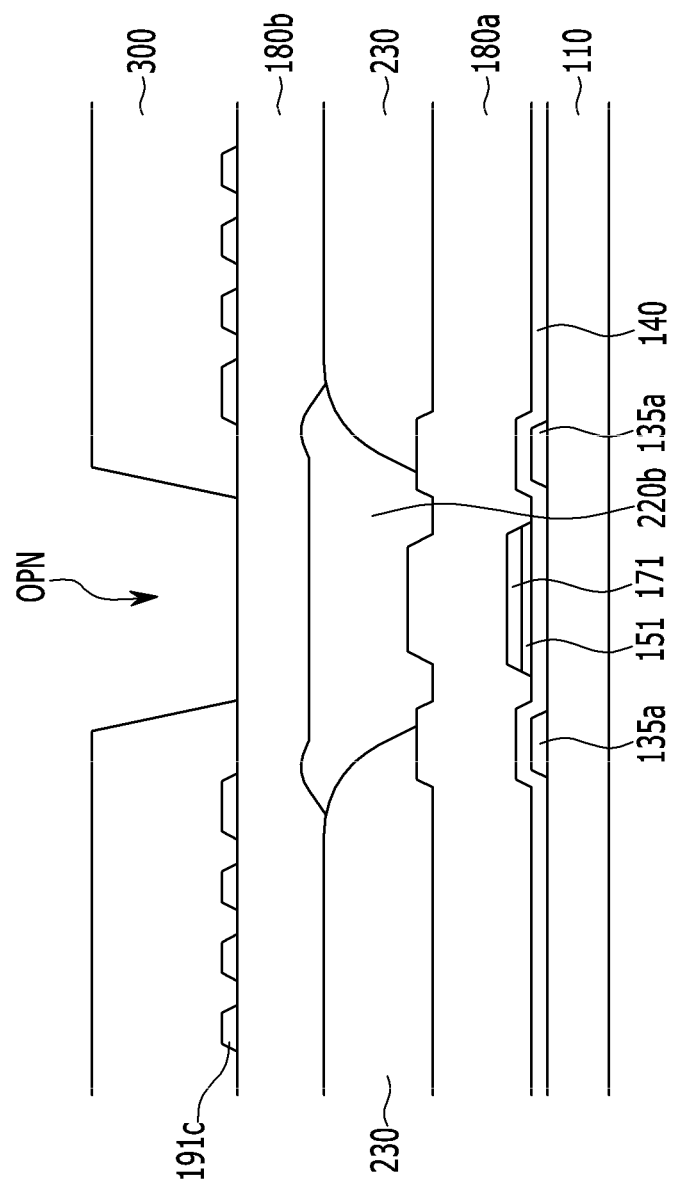

Referring to FIGS. 5 and 6, the gate line 121 and the storage electrode line 131 are formed on the substrate 110, the gate insulating layer 140 is formed on the gate line 121 and the storage electrode line 131, the semiconductor layer 151 is formed on the gate insulating layer 140, and the data line 171 and the drain electrode 175 are formed on the semiconductor layer 151.

The gate line 121 and the storage electrode line 131 extend in a horizontal direction, and the data line 171 crosses the gate line 121 and the storage electrode line 131 and extends in a vertical direction. The gate line 121 includes the gate electrode 124 protruding in a vertical direction, the semiconductor layer 151 includes the projection 154 overlapping the gate electrode 124, and the data line 171 protrudes toward the gate electrode 124 and includes the source electrode 173 formed on the projection 154 of the semiconductor layer 151. The drain electrode 175 is separated from the data line 171, is formed on the projection 154 of the semiconductor layer 151, and faces the source electrode 173.

The first interlayer insulating layer 180a is formed on the data line 171, the drain electrode 175, the projection 154 of the semiconductor layer 151 between the source electrode 173 and the drain electrode 175, and the gate insulating layer 140, and the color filter 230, the horizontal light blocking member 220a, and the vertical light blocking member 220b are formed on the first interlayer insulating layer 180a.

The horizontal light blocking member 220a is formed in a direction parallel with the gate line 121, and the vertical light blocking member 220b is formed in a direction parallel with the data line. The horizontal light blocking member 220a and the vertical light blocking member 220b are connected to each other to have a lattice structure having an opening, and the color filter 230 is formed in the opening by the horizontal light blocking member 220a and the vertical light blocking member 220b.

The second interlayer insulating layer 180b is formed on the color filter 230, the horizontal light blocking member 220a, and the vertical light blocking member 220b, and thereafter, the contact hole 185 exposing a part of the drain electrode 175 is formed in the horizontal light blocking member 220a, and the first and second interlayer insulating layers 180a and 180b.

The pixel electrode 191 connected with the drain electrode 175 is formed on the second interlayer insulating layer 180b and extends through the contact hole 185, and the sacrificial layer 300 is formed on the pixel electrode 191.

The sacrificial layer 300 includes a plurality of protrusions 301. The protrusions 301 overlap the horizontal light blocking member 220a.

In the sacrificial layer 300, an open portion OPN is formed parallel with the data line 171. The open portion OPN is formed at a position corresponding to the vertical light blocking member 220b.

Figure 7:
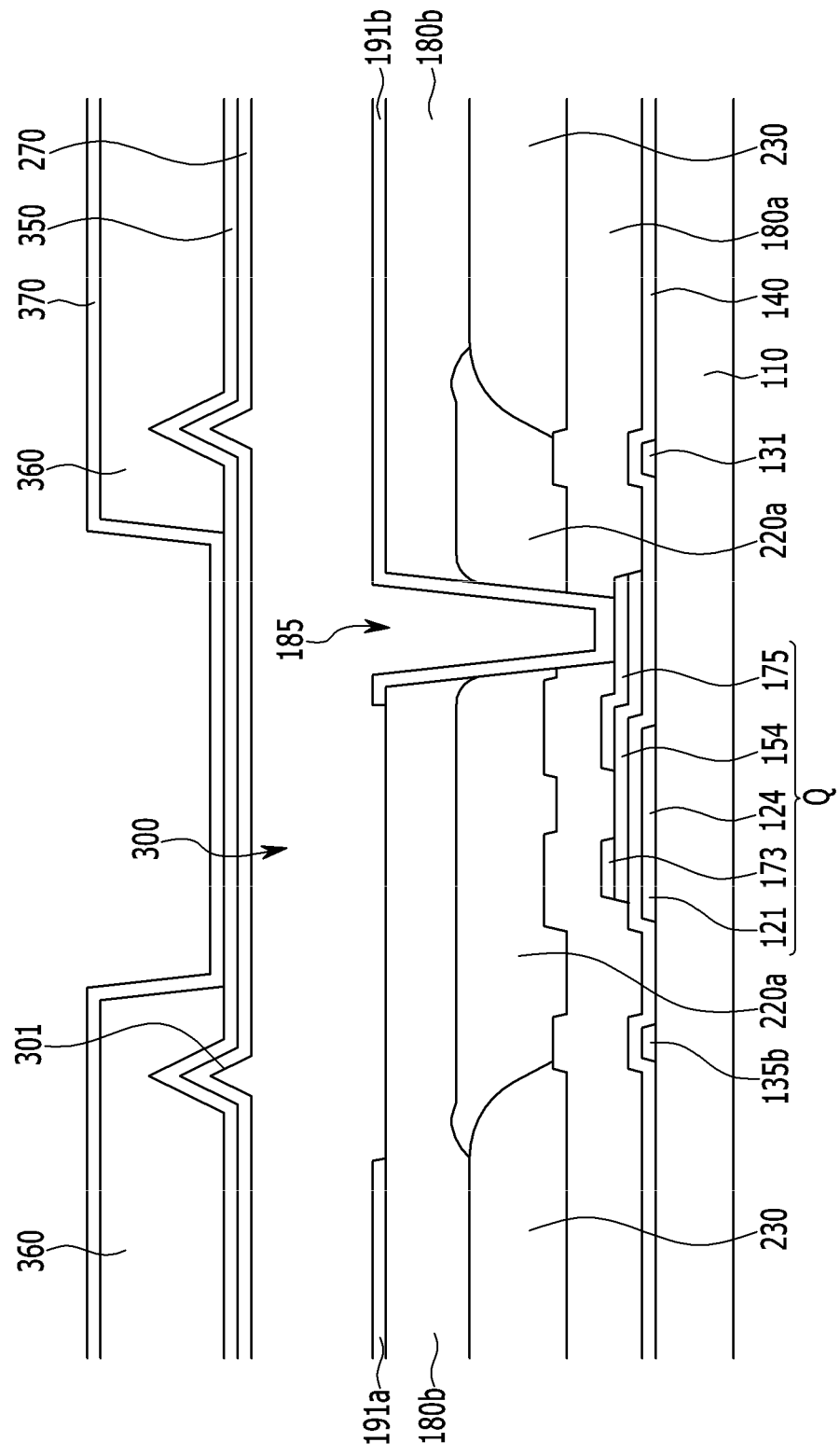
Figure 8:
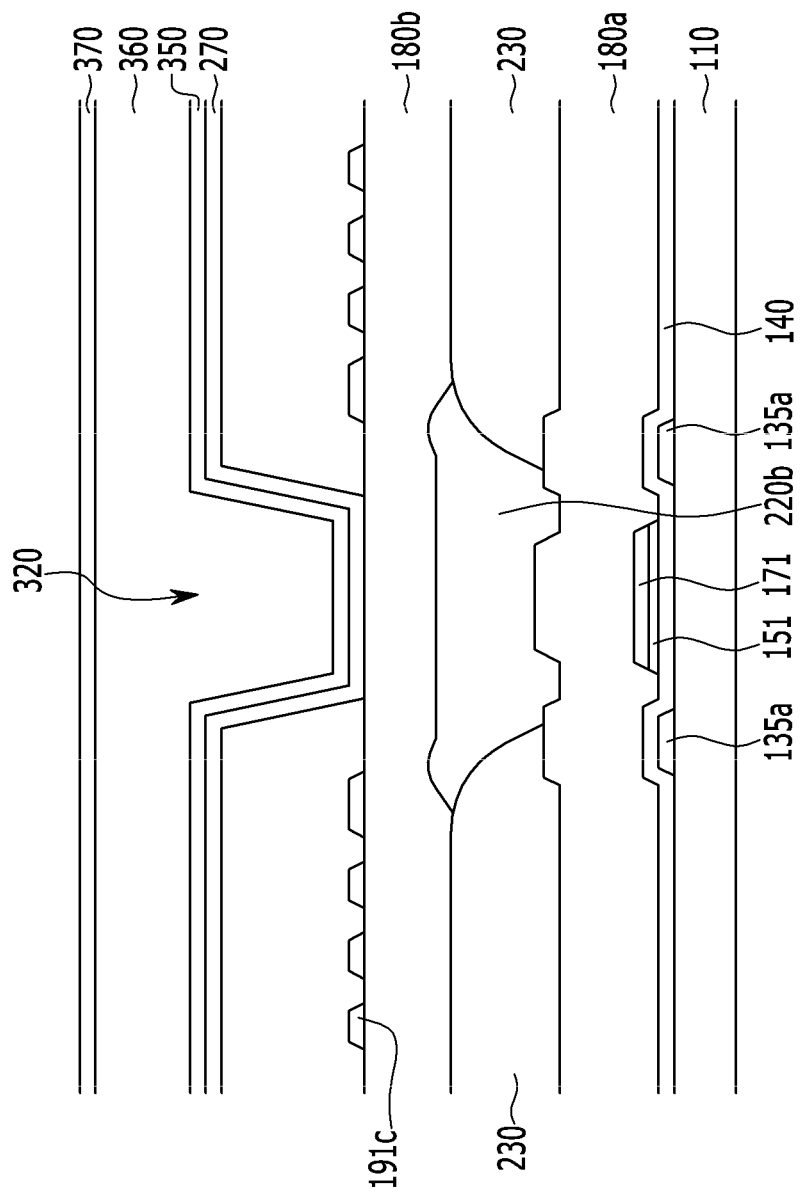

Referring to FIGS. 7 and 8, the common electrode 270 (or a conductive material layer for subsequently forming the common electrode 270), the lower insulating layer 350 (or an insulating material layer for subsequently forming the insulating layer 350), the roof layer 360 (or pre-bend roof layer 360), and the upper insulating layer 370 (or an insulating material layer for subsequently forming the insulating layer 370) are sequentially formed on the sacrificial layer 300. Given the existence of a protrusion 301, the pre-bend roof layer 360, the insulating layer 350 (or insulating material layer), and the common electrode 270 (or conductive material layer) have respective grooves that conform to the protrusion 301.

A portion of the roof layer 360 corresponding to the horizontal light blocking member 220a and positioned between pixels adjacent to each other in the vertical direction (the y direction) is removed by exposing and developing processes. The common electrode 270, the lower insulating layer 350, and the roof layer 360 fill the open portion OPN to form the partition wall portion 320.

Figure 9:
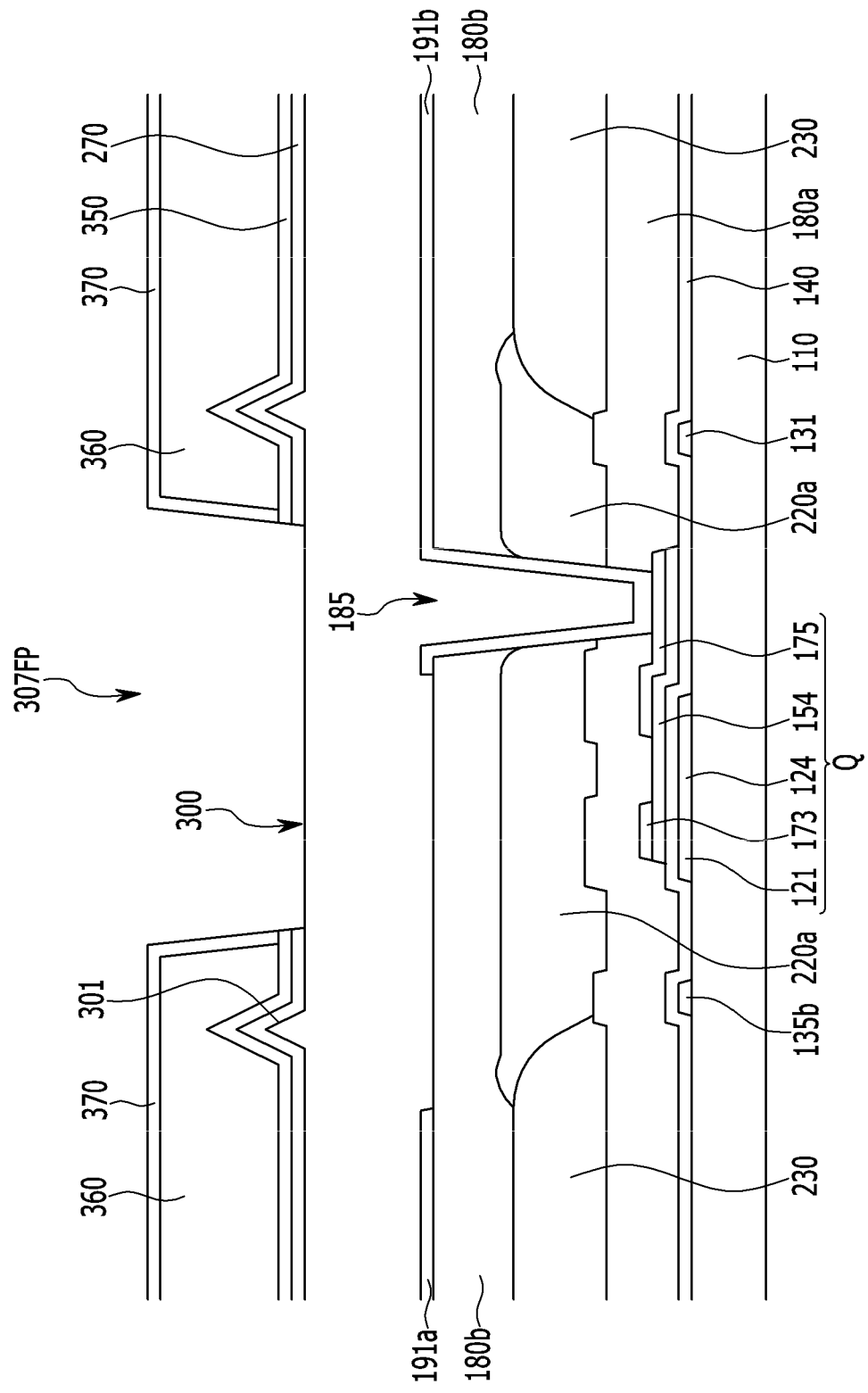

Referring to FIG. 9, the liquid crystal injection hole formation region 307FP is formed by etching (e.g., dry etching) the upper insulating layer 370, the lower insulating layer 350, and the common electrode 270 at the position corresponding to the horizontal light blocking member 220a. In an embodiment, the upper insulating layer 370 covers a top side and a lateral side of the roof layer 360.

Figure 10:
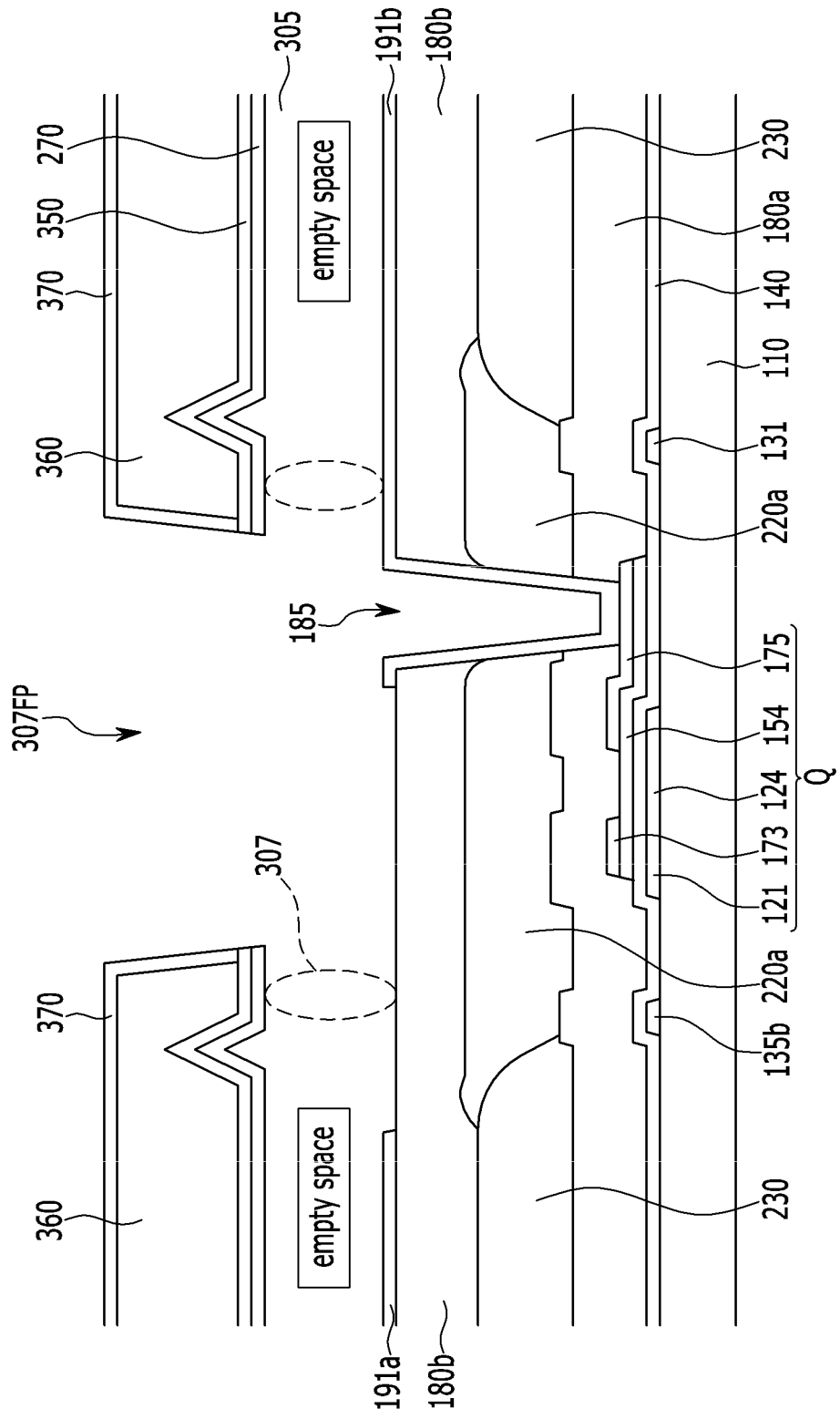
Figure 11:
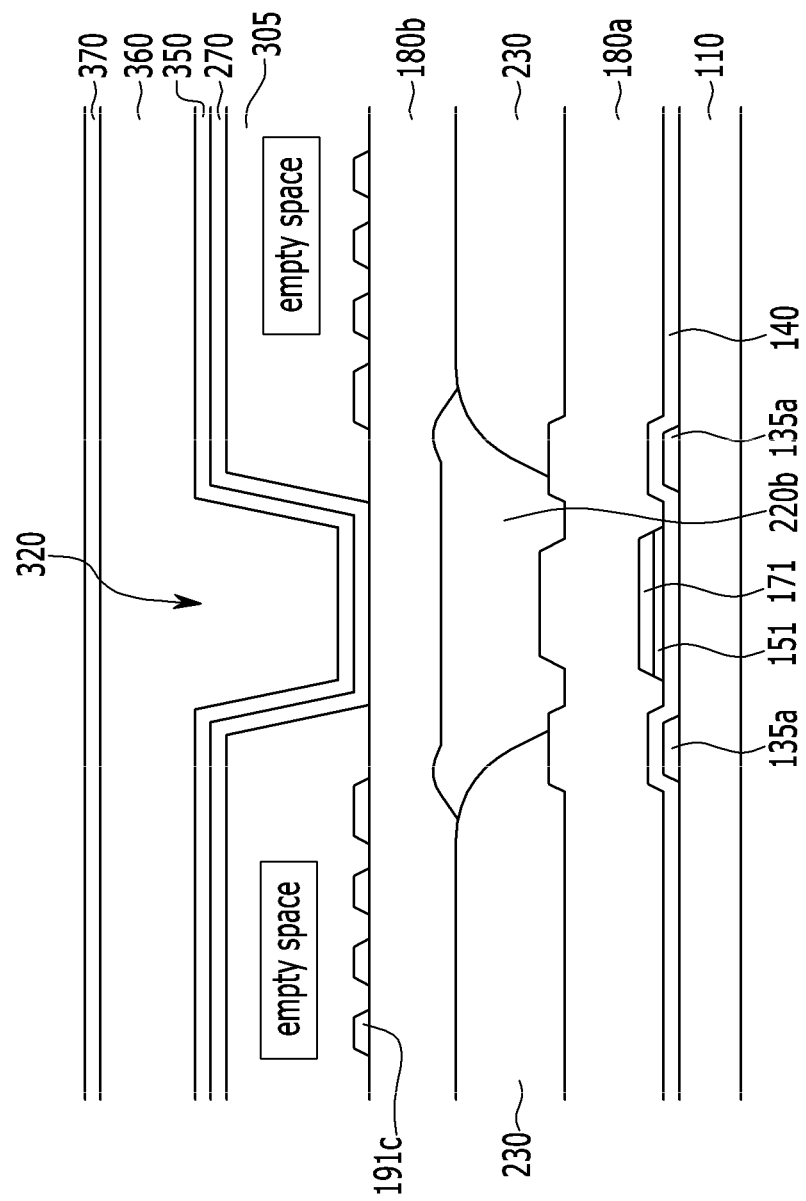

Referring to FIGS. 10 and 11, the sacrificial layer 300 is removed by an ashing process using oxygen ($O_2$) gas, a wet-etching method, or an alternative process through the liquid crystal injection hole formation region 307FP. As a result, the microcavity 305 and the liquid crystal injection hole 307 are formed. The microcavity 305 is an empty space formed after the sacrificial layer 300 has been removed. A protrusion 301 of the sacrificial layer 300 is removed to form an empty space in a groove of the pre-bend roof layer 360.

Figure 12:
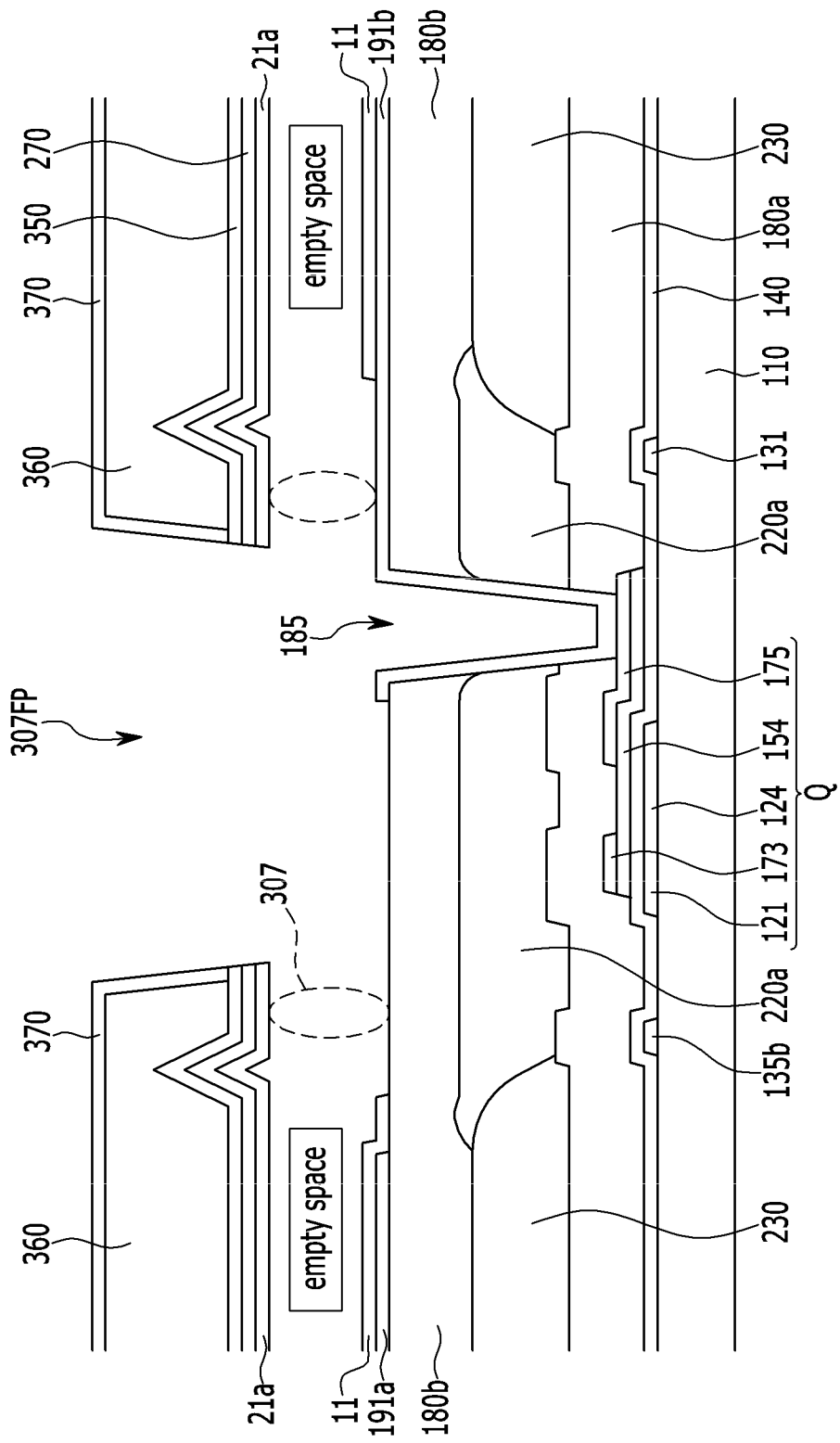
Figure 13:
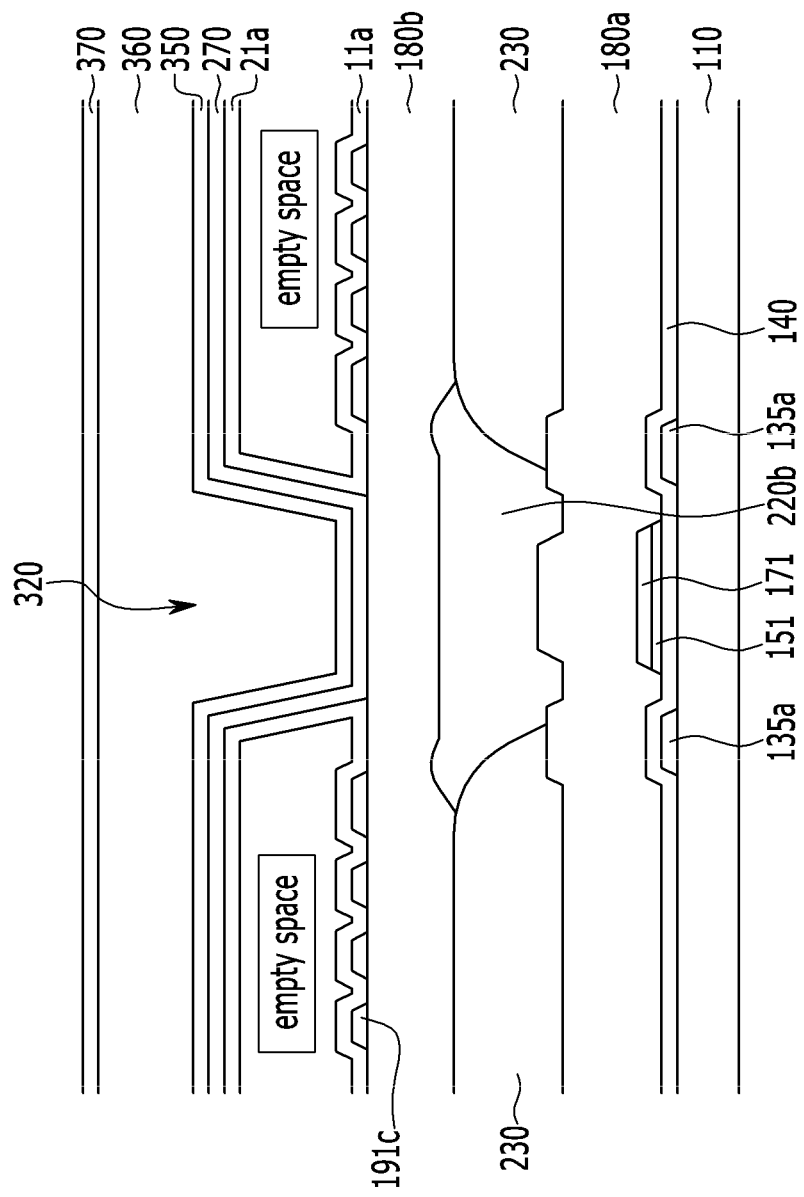

Referring to FIGS. 12 and 13, a lower alignment material layer 11a and an upper alignment material layer 21b are formed by injecting an alignment material into the microcavity 305 through the liquid crystal injection hole 307. The lower alignment material layer 11a is formed on the pixel electrode 191, and the upper alignment material layer 21a is formed on one surface of the common electrode 270.

Figure 14:
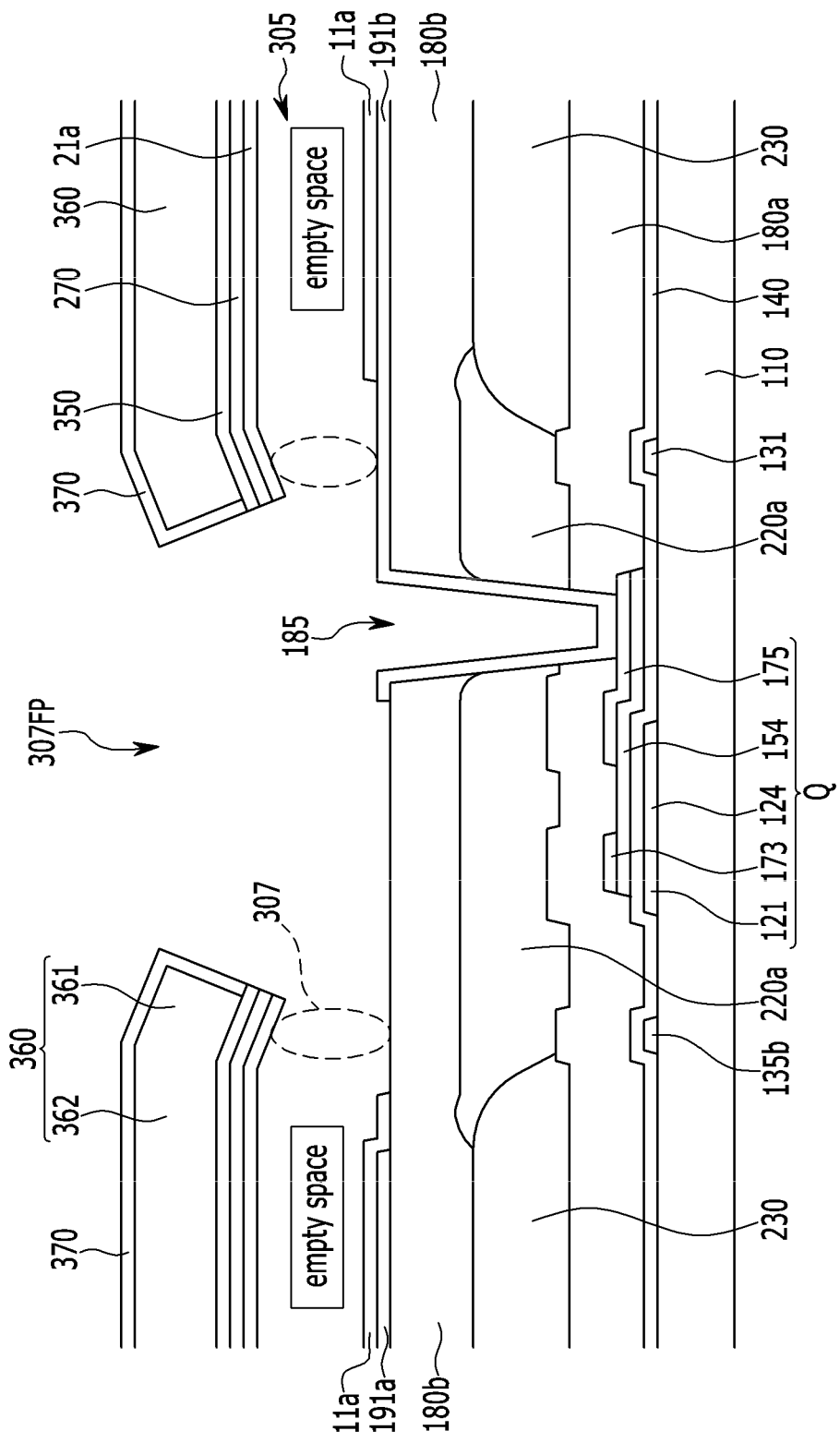
Figure 15:
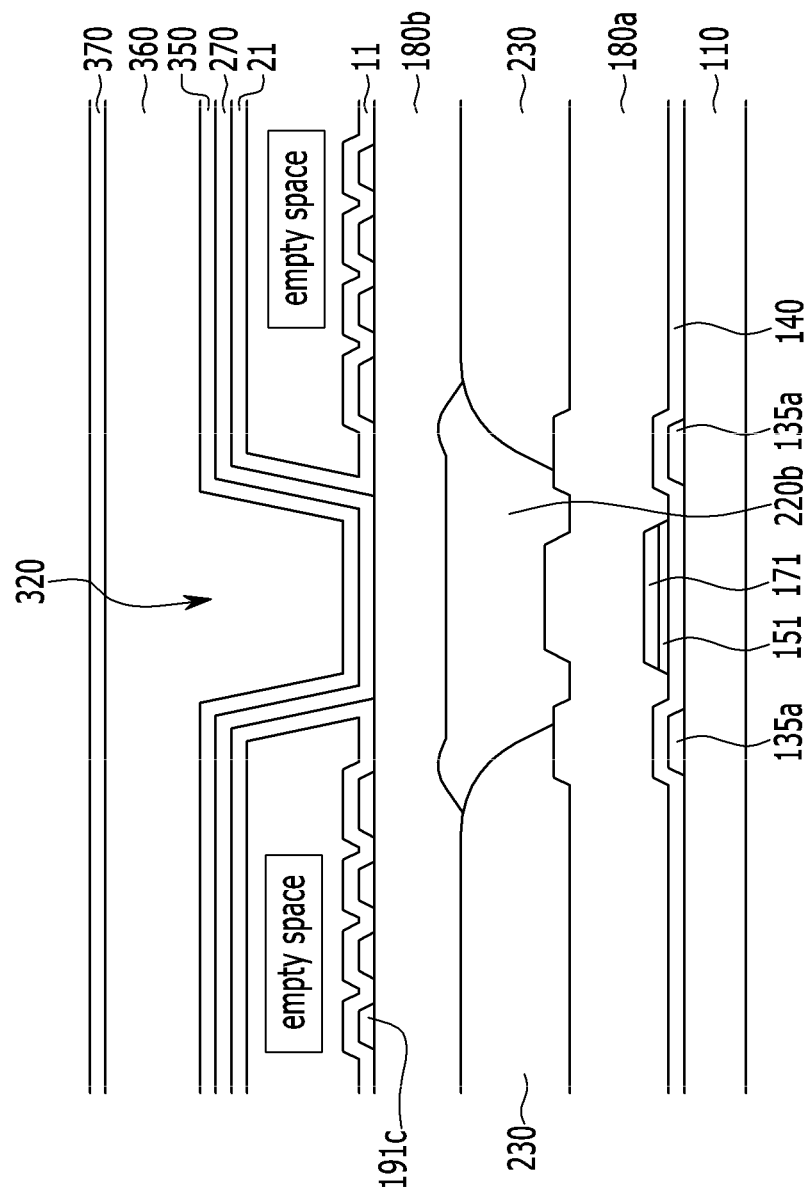

Referring to FIGS. 14 and 15, the lower alignment layer 11 and the upper alignment layer 21 are formed by curing (or solidifying) the lower alignment material layer 11a and the upper alignment material layer 21a. The lower alignment layer 11 is formed on the pixel electrode 191, and the upper alignment layer 21 is formed on one surface of the common electrode 270.

The lower alignment material layer 11a and the upper alignment material layer 21a are cured (or solidified) by performing a bake process. When the upper alignment material layer 21a is cured, (the volume of) the upper alignment material layer 21a contracts (or shrinks), and the portion of the upper alignment material layer 21a disposed at the groove and illustrated in FIG. 12 contracts or disappears, such that sides of the groove approach and/or contact each other and that the groove may be substantially reduced or closed. As a result, a portion of the roof layer 360 corresponding to the liquid crystal injection hole 307 is bent toward the substrate 110 to form the inclined portion 361. Therefore, the roof layer 360 includes the flat portion 362 and the inclined portion 361. The inclined portion 361 is inclined toward the substrate 110 from the flat portion 362. Thus, a lower surface of the inclined portion 361 is disposed under an extension line of a lower surface of the flat portion 362.

The inclined portion 361 overlaps with the horizontal light blocking member 220a. Since light facing the inclined portion 361 is blocked by the light blocking member 220a, light may be prevented from passing through the inclined portion 361.

Figure 16:
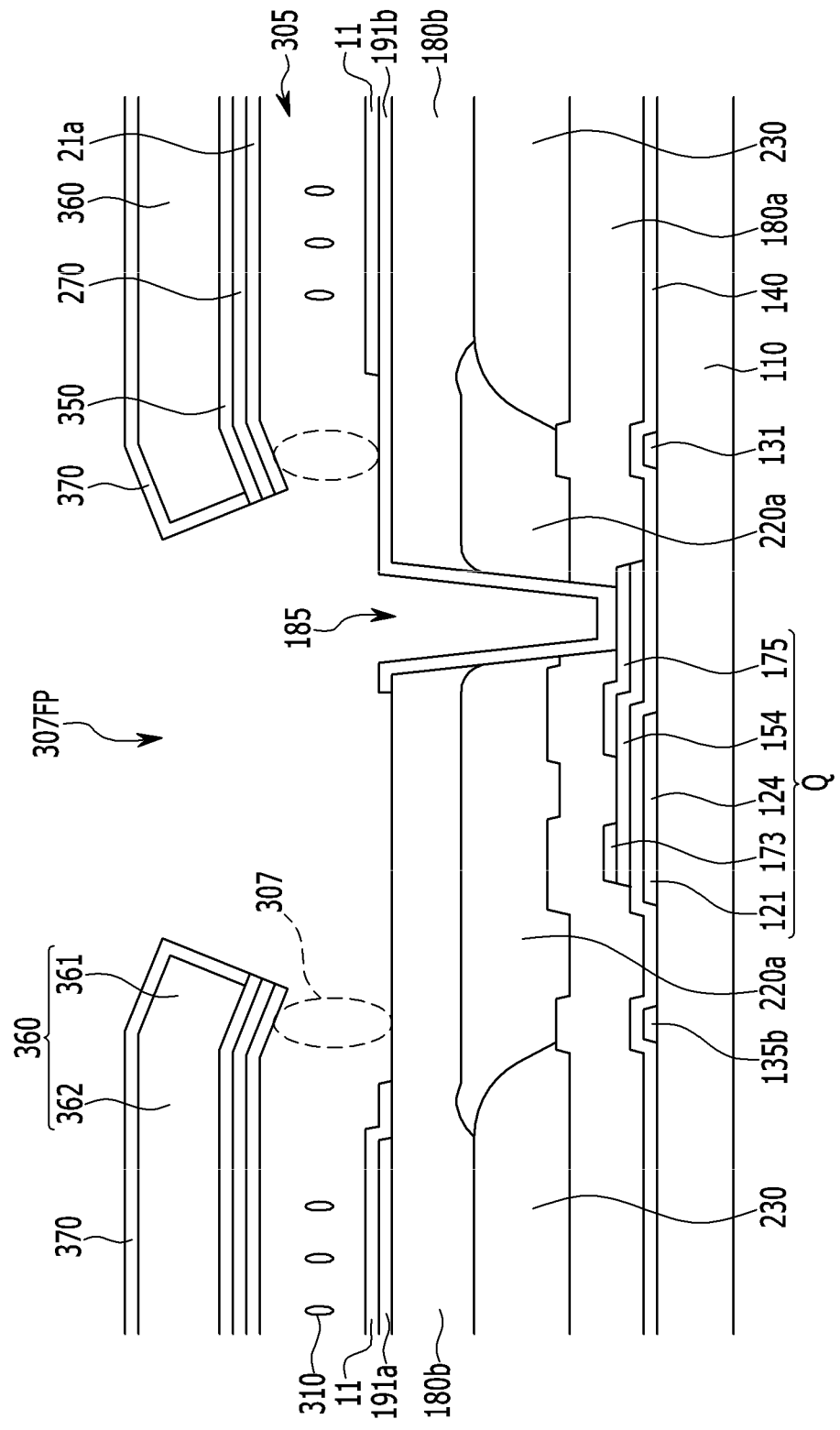
Figure 17:
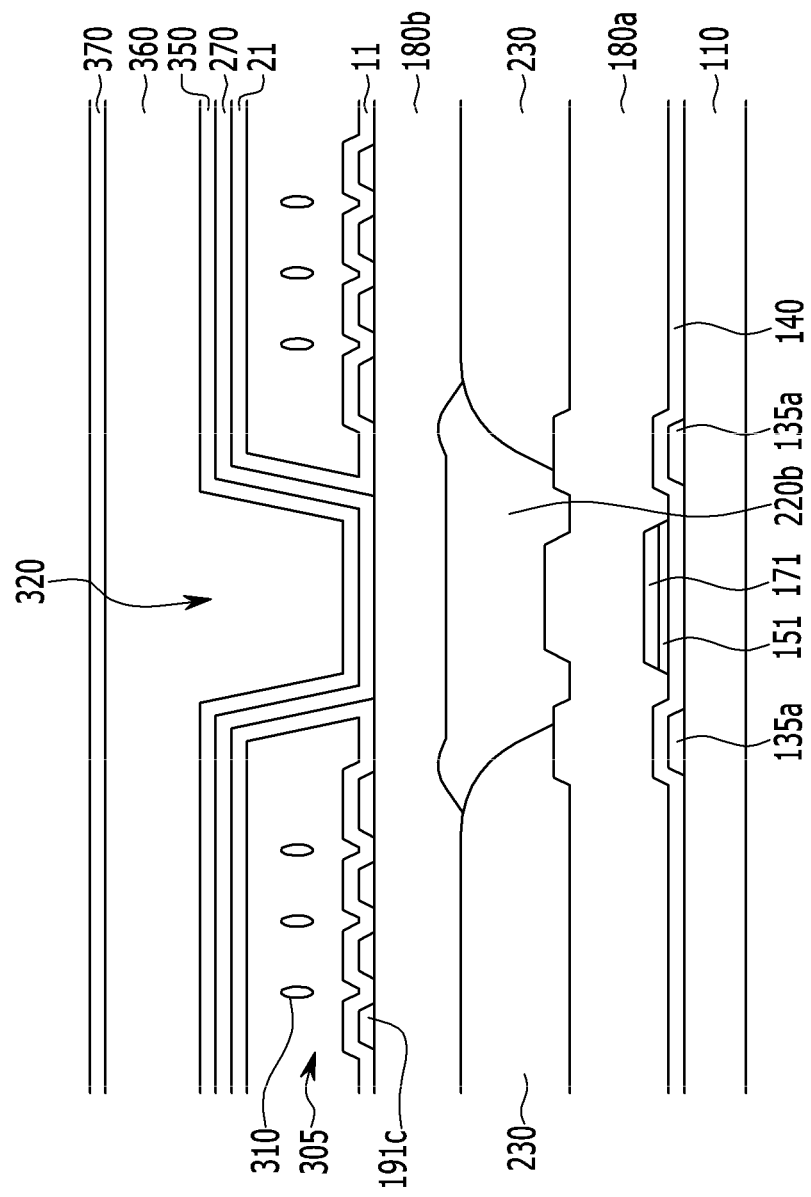

Referring to FIGS. 16 and 17, liquid crystal material including liquid crystal molecules 310 is injected into the microcavity 305 through the liquid crystal injection hole 307 using an inkjet method or an alternative method.

For providing the liquid crystal material into the microcavity 305, the liquid crystal material may be provided using an inkjet process and may be injected into the liquid crystal injection hole 307 using capillary force. Without the inclined portion 361, a substantial amount of the liquid crystal material may remain on the roof layer 360. In an embodiment, since the inclined portion 361 is disposed at a liquid crystal injection hole 307 (through which the liquid crystal material is injected), the liquid crystal material may easily flow down along the inclined portion 361 toward the liquid crystal injection hole 307. Advantageously, liquid crystal material may be prevented from remaining on the roof layer 360 and may be effectively utilized.

Referring to FIGS. 3 and 4, the capping layer 390 is formed on the upper insulating layer 370 to cover the liquid crystal injection hole 307. The capping layer 390 may cover the liquid crystal injection hole formation region 307FP. The capping layer 390 may be formed by pushing a capping material from an edge of the structure shown in FIGS. 16 and 17 to an opposite edge of the structure shown in FIGS. 16 and 17 using a bar coater and simultaneously performing UV-curing.

In summary, as illustrated in FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, and FIG. 17, a method for manufacturing a display device may include the following steps: preparing a substrate 110; providing a transistor Q; providing a pixel electrode 191a; providing a roof layer 360; and providing a liquid crystal layer 310 between the substrate 110 and the roof layer 360. The roof layer 360 may include a (flat) roof portion 362 and a (inclined) roof portion 361. The roof portion 362 may overlap the pixel electrode 191a and may be directly connected to the roof portion 361. The roof portion 361 may be positioned closer to the transistor Q than the roof portion 362. A minimum distance between the substrate 110 and the roof portion 361 may be less than a minimum distance between the substrate 110 and the roof portion 362.

A first side of the roof portion 362 may be positioned between the substrate 110 and a second side of the roof portion 362. A first side of the roof portion 361 may be positioned between the substrate 110 and a second side of the roof portion 361. A minimum distance between the substrate 110 and the first side of the roof portion 361 may be less than a minimum distance between the substrate 110 and the first side of the roof portion 362. The first side of the roof portion 361 may be oriented at an obtuse angle (i.e., an angle greater than 90 degrees and less than 180 degrees) with respect to the first side of the roof portion 362.

The method may include providing a roof material layer (e.g., the pre-bend roof layer 360 shown in FIG. 12) that has a groove. The method may include deforming (e.g., bending) the roof material layer at the groove to form the roof layer 360. The groove may have a substantially triangular or V-shaped cross section. The groove may be reduced (and substantially closed) when the roof material layer is deformed (e.g., bent).

The method may include providing an alignment material layer 21a on the roof material layer. A portion of the alignment material layer 21a may be positions inside the groove. The method may include shrinking the portion of the alignment material layer 21a to reduce the groove and to deform the roof material layer for forming the roof layer 360.

A first side of the groove may be oriented at an acute angle with respect to a second side of the groove before the roof material layer is deformed. The acute angle may be greater than or equal to a supplementary angle of the obtuse angle. The supplementary angle of the obtuse angle is equal to 180 degrees minus the obtuse angle. The acute angle may be substantially equal to the supplementary angle of the obtuse angle.

The method may include providing a light blocking member 220a before providing the roof material layer. The groove may overlap the light blocking member 220a after the roof material layer has been provided.

The method may include providing a sacrificial layer 300 that includes a protrusion 301. The groove may be formed at (and overlap) the protrusion 301. A portion of the protrusion 301 may be positioned inside the groove. The method may include removing the sacrificial layer 300.

The method may include providing a conductive layer on the sacrificial layer 300. A portion of the conductive layer may be positioned inside the groove after the roof material layer has been formed. The method may include forming a common electrode 270 using the conductive layer.

The method may include providing a light blocking member 220a before providing the sacrificial layer 300. The protrusion 301 may overlap the light blocking member 220a after the sacrificial layer 300 has been provided.

A first side of the protrusion 301 may be oriented at an acute angle with respect to a second side of the protrusion 301. The acute angle may be greater than or equal to a supplementary angle of the obtuse angle. The supplementary angle of the obtuse angle is equal to 180 degrees minus the obtuse angle. The acute angle may be substantially equal to the supplementary angle of the obtuse angle.

According to embodiments, the inclined roof portion 361 may facilitate liquid crystal material to flow toward microcavities and/or may substantially prevent liquid crystal material from remaining on the roof layer 360. Advantageously, liquid crystal material may be effectively utilized.

While some embodiments have been described as examples, possible embodiments are not limited to the described embodiments. Embodiments are intended to cover various modifications and equivalent arrangements applicable within the spirit and scope defined by the appended claims.

What is claimed is:

1. A liquid crystal display, comprising:
a substrate;
a thin film transistor disposed on the substrate;
a pixel electrode connected to the thin film transistor;
a roof layer disposed on the pixel electrode;
a liquid crystal layer positioned in a microcavity between the pixel electrode and the roof layer; and
a light blocking member disposed between the pixel electrode and the thin film transistor,
wherein the roof layer includes a flat portion and an inclined portion connected to the flat portion,
wherein the inclined portion is inclined toward the substrate from the flat portion,
wherein a lower surface of the inclined portion is disposed under an extension line of a lower surface of the flat portion, and
wherein the inclined portion is disposed at a side of the microcavity.

2. The liquid crystal display of claim 1, wherein the inclined portion overlaps with the light blocking member.

3. The liquid crystal display of claim 1, further comprising an alignment layer disposed on an inner surface of the microcavity.

4. The liquid crystal display of claim 3, wherein the alignment layer includes a lower alignment layer disposed on the pixel electrode and an upper alignment layer facing the lower alignment layer.

5. The liquid crystal display of claim 4, further comprising a common electrode disposed between the upper alignment layer and the roof layer.

6. The liquid crystal display of claim 1, further comprising a capping layer covering the liquid crystal injection hole and disposed on the roof layer.

7. A display device comprising:
a substrate;
a transistor;
a pixel electrode;
a roof layer comprising a first roof portion and a second roof portion, wherein the first roof portion overlaps the pixel electrode and is directly connected to the second roof portion, wherein the second roof portion is positioned closer to the transistor than the first roof portion, and wherein a minimum distance between the substrate and the second roof portion is less than a minimum distance between the substrate and the first roof portion; and
a liquid crystal layer positioned in a microcavity between the substrate and the roof layer, the liquid crystal layer overlapping both the first roof portion and the second roof portion.

8. The display device of claim 7, further comprising: a capping layer directly contacting an edge of the liquid crystal layer and overlapping the transistor, wherein the second roof portion overlaps the edge of the liquid crystal layer in a direction perpendicular to the substrate.

9. The display device of claim 7, further comprising: a light blocking member overlapping each of the transistor and the second roof portion.

10. The display device of claim 7, wherein a first side of the first roof portion is positioned between the substrate and a second side of the first roof portion, wherein a first side of the second roof portion is positioned between the substrate and a second side of the second roof portion, and wherein a minimum distance between the substrate and the first side of the second roof portion is less than a minimum distance between the substrate and the first side of the first roof portion.

11. The display device of claim 10, wherein the first side of the second roof portion is oriented at an obtuse angle with respect to the first side of the first roof portion.

12. The display device of claim 11, wherein the first side of the second roof portion is oriented at the obtuse angle with respect to at least one of the substrate and the second side of the first roof portion.

13. The display device of claim 11, wherein the second side of the second roof portion is oriented at the obtuse angle with respect to at least one of the substrate and the second side of the first roof portion.

* * * * *